Oct. 21, 1941.   E. H. PIRON   2,259,776
WHEEL AND PLATE STRUCTURE
Filed July 22, 1938

Inventor
Emil H. Piron
by [signature]
Attorney

Patented Oct. 21, 1941

2,259,776

UNITED STATES PATENT OFFICE 2,259,776

WHEEL AND PLATE STRUCTURE

Emil H. Piron, New York, N. Y., assignor to Transit Research Corporation, New York, N. Y., a corporation of New York Application July 22, 1938, Serial No. 220,644

6 Claims. (Cl. 295—11)

This invention relates to resilient wheels wherein elastic elements act in shear to provide resiliency between a tire or rim and the hub, and has for its principal object to provide a wheel of this type of utmost lateral rigidity in the smallest lateral space.

It is conventional practice to construct wheels of two main radial plates, a tread surface having an inside web or plate portion and elastic shear elements separating the web from each of the main plates. The main plates are stiffened by conical or pyramidal bracing plates. Because of limitations of hub design there is a present thickness of the elastic elements which prohibits any substantial increase in this thickness. It is, therefore, the object of this invention to provide a wheel which will retain its present lateral or hub dimensions together with its present lateral rigidity and yet which will permit the use of thicker and, hence, softer, elastic sheer elements.

More particularly it is an object to provide a wheel having two main radial plates, as above described, one of which is stiffened by a conical bracing plate, the other of which is without the conical stiffener, in combination with means for transferring all forces tending to deflect or flare the last named plate to the first mentioned one. As will be hereinafter described, these means for transferring forces from one plate to the other may be in the form of a plurality of transverse bolts connecting the plates and substantially spaced from the hub, the compression on the elastic elements being imposed by a single nut threaded on the hub.

Other objects and advantages will become more fully apparent as reference is had to the accompanying drawing wherein my invention is illustrated, and in which.

Figure 1:
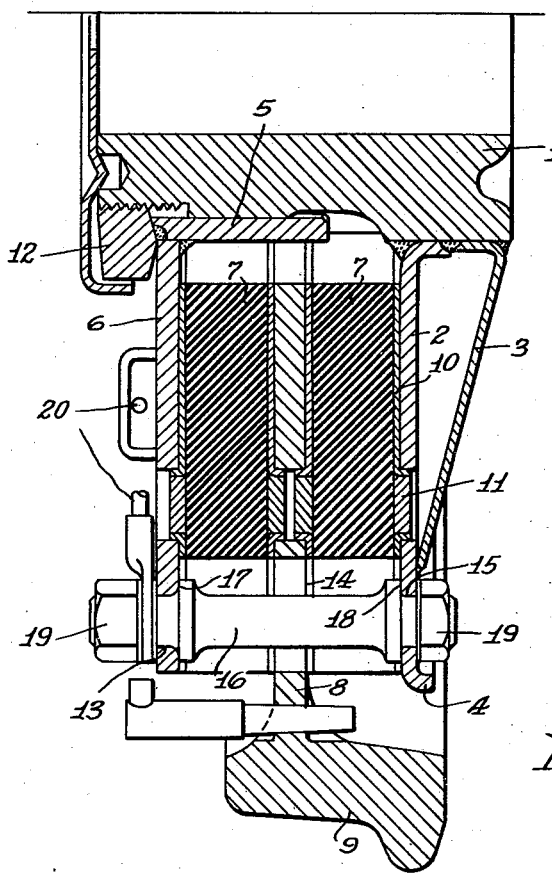
Fig. 1 is a transverse diametric cross-sectional view of one-half a wheel constructed in accord with my invention.
Figures 2, 3:
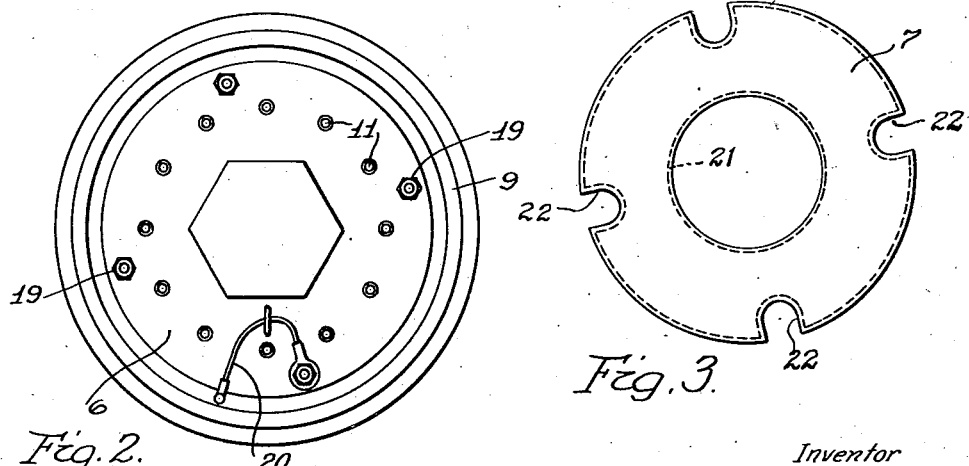
Fig. 2 is a side elevation of the wheel of Fig. 1 in reduced scale.
Fig. 3 is a side elevation of an elastic element used in the wheel.

More particularly, 1 refers to the hub of the wheel having a main radial plate 2 welded or otherwise fixedly secured thereto. A conical bracing plate 3 extends from the hub to an attaching point or attaching circle near the periphery of the main plate 2. This plate 3 together with an outwardly flared flange portion 4 rigidifies the main plate 2. A sleeve 5 fits onto the hub 1 and carries a second main plate 6, which extends radially therefrom. As the collar and its plate is slid onto the hub, it imposes compression on two elastic springing elements 7 which support a tire carrying plate 8 with which the rail contacting tire 9 is integrally made. Each of the elements 7 has metallic discs 10 of some suitable thin material surface-bonded thereto and the discs 10 are doweled at 11 to their respective main plates. A nut 12 maintains the sleeve 5 in its compressive relation with respect to the elements 7 so that relative radial movements between the tire 9 and the hub 1 are sustained by the elements 7 acting in shear.

It will be noted that the plate 6 is not equipped with a bracing plate equivalent to the plate 3. Lateral relative forces between the hub 1 and tire 9 would tend to spring this plate 6 outwardly and in order to transfer such forces to the plates 2 and 3, I provide openings 13, 14 and 15 through the plates 6, 8 and 2 respectively, and openings through the elements 7, as hereinafter referred to. Through these openings I insert bolts 16 which are provided with shoulders 17 and 18 for contact with the inside surfaces of the plates 6 and 2 respectively. The bolt 16 is threaded outwardly of the shoulders 17 for the reception of the nuts 19 which rigidify the bolt 16 with respect to each main plate. The bolt with its shoulders 17 and 18 serves to space the main plates with exactness. The opening 14 through the plate 8 and the openings through the elements 7 are sufficiently large to permit relative springing movement of the plate 8 with respect to the plates 2 and 6 without contact. The plates 2 and 6 are grounded to the tire 9 through the connection 20, which is exteriorly of the plate 6.

In order to form the openings in the elastic elements 7, a series of peripheral U-shaped radially disposed cut out portions 22 are provided. Also the internal and external peripheral edges of the elements 7 are formed with an original concavity as indicated by the dotted lines 21, which follows around the cut out portions 22 and which is preferably of such depth that the peripheries will not bulge when the elements are assembled under compression.

It will be seen from this construction that any tendency of the plate 6 to deflect will be resisted by its own strength and also by the bolts 16 in cooperation with the shoulders 17 and 18 and the nuts 19. By the same token, the plate 6 assists in rigidifying the plate 2 against lateral deflection. The single central nut 12 urging the imposition of compression on rubber at the hub in combination with plurality of spacers acting near the outer periphery of the plates is a very important structural feature of my invention.

In view of the fact that one of the main reasons for omitting a bracing plate equivalent to plate 3 for the main plate 6 is to provide space for a greater thickness of the element 7, the plate 8 is in a different position on the hub, other conditions being the same, and in order to compensate for this changed position the tire 9 is laterally offset off its center line with respect to the plate 8. The hub 1 can, therefore, remain at its original position, that is, the position designated for it before the increase in width of the springing elements and the tire will assume a proper relation with its rail.

What is claimed is:

1. A resilient wheel comprising a hub having relatively movable sheet metal main plates radiating therefrom, a tire carrying plate between said main plates, elastic shear elements separating said tire carrying plate from the main plates, the central region of one main plate being rigidly secured to the hub, means acting against the central region of the movable plate for holding it in a position compressing the elastic elements, and means maintaining the outer regions of the main plates in their original radial planes in the presence of the reacting pressure of the compressed elastic elements as well as the lateral forces occurring during use of the wheel, said means comprising tie members extending between peripheral regions of the two main plates and a rigid brace extending from a peripheral region of the fixed main plate to the hub.

2. A resilient wheel comprising a hub having relatively movable sheet metal main plates radiating therefrom, a tire carrying plate between said main plates, elastic shear elements separating said tire carrying plate from the main plates, the central region of one main plate being rigidly secured to the hub, means acting against the central region of the movable plate for holding it in a position compressing the elastic elements, and means maintaining the outer regions of the main plates in their original radial planes in the presence of the reacting pressure of the compressed elastic elements as well as the lateral forces occurring during use of the wheel, said means comprising tie members extending between peripheral regions of the two main plates and a conical brace rigidly attached to the fixed plate in a peripheral region thereof and rigidly attached to said hub in a plane spaced axially outward from the plane of the fixed main plate.

3. A resilient wheel comprising a hub having relatively movable sheet metal main plates radiating therefrom, a tire carrying plate between said main plates, elastic shear elements separating said tire carrying plate from the main plates, the central region of one main plate being rigidly secured to the hub, the other main plate being fixed upon a sleeve, said sleeve being axially movable on said hub, means acting against said sleeve to hold said other plate in a position compressing said elastic elements, and means maintaining the outer regions of the main plates in their original radial planes in the presence of the reacting pressure of the compressed elastic elements as well as the lateral forces occurring during use of the wheel, said means comprising tie members extending between peripheral regions of the two main plates and a rigid brace extending from a peripheral region of the fixed main plate to the hub.

4. A resilient wheel comprising a hub having relatively movable sheet metal main plates radiating therefrom, a tire carrying plate between said main plates, elastic shear elements separating said tire carrying plate from the main plates, the central region of one main plate being rigidly secured to the hub, the other main plate being fixed upon a sleeve, said sleeve being axially movable on said hub, means acting against said sleeve to hold said other plate in a position compressing said elastic elements, and means maintaining the outer regions of the main plates in their original radial planes in the presence of the reacting pressure of the compressed elastic elements as well as the lateral forces occurring during use of the wheel, said means comprising tie members extending between peripheral regions of the two main plates and a conical brace rigidly attached to the fixed plate in a peripheral region thereof and rigidly attached to said hub in a plane spaced axially outward from the plane of the fixed main plate.

5. A resilient wheel comprising a hub, a sheet metal main plate radiating from said hub and rigidly fixed thereto at a point spaced inwardly from one end thereof, a second sheet metal main plate radiating from said hub and axially movable with respect thereto, a nut on the other end of said hub, a tire carrying plate between said main plates, elastic shear elements separating the tire carrying plate from the main plates, said nut being positioned to hold the movable main plate in a position compressing said elastic elements, and means for maintaining the outer regions of the main plates in their original radial planes in the presence of the reacting pressure of said compressed elastic elements as well as the lateral forces occurring during use of the wheel, said means comprising tie members extending between peripheral regions of the two main plates and a rigid brace extending from a peripheral region of said fixed main plate to the outer end of the hub portion which extends outwardly of the fixed main plate.

6. A resilient wheel comprising a hub, a sheet metal main plate radiating from said hub and rigidly fixed thereto at a point spaced inwardly from one end thereof, a second sheet metal main plate radiating from said hub and axially movable with respect thereto, a nut on the other end of said hub, a tire carrying plate between said main plates, elastic shear elements separating the tire carrying plate from the main plates, said nut being positioned to hold the movable main plate in a position compressing said elastic elements, and means for maintaining the outer regions of the main plates in their original radial planes in the presence of the reacting pressure of said compressed elastic elements as well as the lateral forces occurring during use of the wheel, said means comprising tie members extending between peripheral regions of the two main plates and a rigid brace extending from a peripheral region of said fixed main plate to the outer end of the hub portion which extends outwardly of the fixed main plate, said tie members comprising bolts having plate spacing shoulders thereon.

EMIL H. PIRON.